(12) United States Patent
Tuttle et al.

(10) Patent No.: US 8,229,967 B2
(45) Date of Patent: Jul. 24, 2012

(54) SPACE EFFICIENT VISUALIZATION OF PEDIGREE DATA

(75) Inventors: Claurissa Tuttle, Salt Lake City, UT (US); Cláudio T. Silva, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 385 days.

(21) Appl. No.: 12/562,413

(22) Filed: Sep. 18, 2009

(65) Prior Publication Data

US 2011/0072009 A1    Mar. 24, 2011

(51) Int. Cl.
*G06F 7/00* (2006.01)
*G06F 17/30* (2006.01)

(52) U.S. Cl. ........ 707/797; 707/805; 707/829; 707/956; 715/854

(58) Field of Classification Search .................. 707/779, 707/797, 805, 829, 956; 715/854
See application file for complete search history.

(56) References Cited

U.S. PATENT DOCUMENTS

| | | | | |
|---|---|---|---|---|
| 4,332,565 | A * | 6/1982 | Mialet | 434/118 |
| 5,301,284 | A | 4/1994 | Estes et al. | |
| 6,570,567 | B1 * | 5/2003 | Eaton | 345/428 |
| 8,074,185 | B2 * | 12/2011 | Sherwood et al. | 715/854 |
| 2005/0116954 | A1 * | 6/2005 | Ripps et al. | 345/440 |
| 2007/0168368 | A1 * | 7/2007 | Stone | 707/100 |
| 2008/0108027 | A1 * | 5/2008 | Sallin | 434/154 |
| 2008/0172407 | A1 * | 7/2008 | Sacks | 707/102 |
| 2008/0288886 | A1 * | 11/2008 | Sherwood et al. | 715/772 |
| 2010/0049736 | A1 * | 2/2010 | Rolls et al. | 707/103 R |

FOREIGN PATENT DOCUMENTS

| KR | 10-20030014301 | 2/2003 |
|---|---|---|
| KR | 10-20090022519 | 3/2009 |

OTHER PUBLICATIONS

International Search Report and Written Opinion received in PCT/US2010/047804, Apr. 28, 2011.

* cited by examiner

*Primary Examiner* — Phong Nguyen
(74) *Attorney, Agent, or Firm* — Bell & Manning, LLC (57) ABSTRACT

A method of visually representing pedigree data is provided. A root individual in a genealogical dataset is identified. A first parent and a second parent of the identified root individual are identified from the genealogical dataset. A third parent and a fourth parent of the identified first parent are identified from the genealogical dataset. A pedigree visualization relative to the identified root individual is presented which includes a root indicator, a first parent indicator, a second parent indicator, a third parent indicator, and a fourth parent indicator. The first parent indicator is presented in a first direction relative to the root indicator, the second parent indicator is presented in a second direction relative to the root indicator, wherein the second direction is opposite the first direction, the third parent indicator is presented in a third direction relative to the first parent indicator, wherein the third direction is perpendicular to the first direction, and the fourth parent indicator is presented in a fourth direction relative to the first parent indicator, wherein the fourth direction is opposite the third direction.

20 Claims, 11 Drawing Sheets

SPACE EFFICIENT VISUALIZATION OF PEDIGREE DATA

REFERENCE TO GOVERNMENT RIGHTS

This invention was made with United States government support awarded by the National Science Foundation, Award No. NSF 04-615. The United States government has certain rights in this invention.

BACKGROUND

Whether for cultural, scientific, social, religious, or other reasons, genealogy has been a topic of great interest throughout the world. Currently, easy access to large genealogical databases has increased the public's interest in this kind of information, as valuable knowledge such as family traditions, historical trends, and medical information, can be obtained by tracking one's ancestors. This increasing amount of available data demands more efficient mechanisms to visualize genealogical data sets than the traditional node-link diagram employed by many existing pedigree visualization tools.

SUMMARY

In an example embodiment, a method of visually representing pedigree data is provided. A root individual in a genealogical dataset is identified. A first parent and a second parent of the identified root individual are identified from the genealogical dataset. A third parent and a fourth parent, who are parents of the identified first parent, are identified from the genealogical dataset. A pedigree visualization relative to the identified root individual is presented which includes a root indicator, a first parent indicator, a second parent indicator, a third parent indicator, and a fourth parent indicator. The first parent indicator is presented in a first direction relative to the root indicator, the second parent indicator is presented in a second direction relative to the root indicator, wherein the second direction is opposite the first direction, the third parent indicator is presented in a third direction relative to the first parent indicator, wherein the third direction is perpendicular to the first direction, and the fourth parent indicator is presented in a fourth direction relative to the first parent indicator, wherein the fourth direction is opposite the third direction.

In another example embodiment, a computer-readable medium is provided having stored thereon computer-readable instructions that, if executed by a computing device, cause the computing device to perform the method of visually representing pedigree data.

In yet another example embodiment, a system is provided. The system includes, but is not limited to, a processor and the computer-readable medium operably coupled to the processor. The computer-readable medium has instructions stored thereon that, if executed by the processor, cause the system to perform the method of visually representing pedigree data.

Other principal features and advantages of the invention will become apparent to those skilled in the art upon review of the following drawings, the detailed description, and the appended claims.

BRIEF DESCRIPTION OF THE DRAWINGS

Example embodiments of the invention will hereafter be described with reference to the accompanying drawings, wherein like numerals denote like elements.

DETAILED DESCRIPTION

Figure 1:
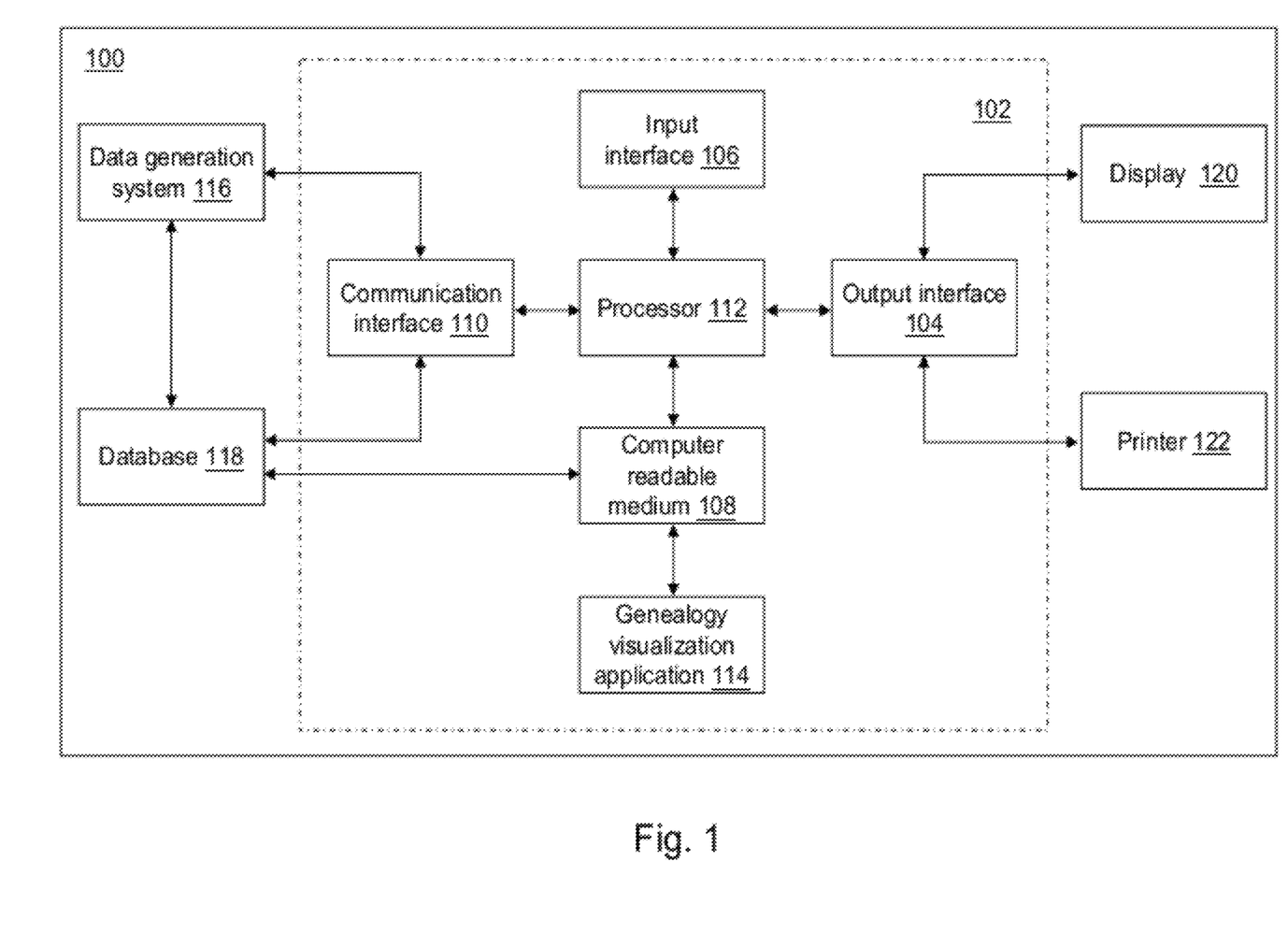
FIG. 1 depicts a block diagram of a pedigree visualization system in accordance with an example embodiment.

With reference to FIG. 1, a block diagram of a pedigree visualization system 100 is shown in accordance with an example embodiment. Pedigree visualization system 100 may include a data generation system 116, a database 118, a computing device 102, a display 120, and a printer 122. Different and additional components may be incorporated into pedigree visualization system 100. Computing device 102 may include an output interface 104, an input interface 106, a computer-readable medium 108, a communication interface 110, a processor 112, and a pedigree visualization application 114. Computing device 102 may be a computer of any form factor. Different and additional components may be incorporated into computing device 102. Display 120 and printer 122 are example output devices for use with computing device 102.

In the embodiment illustrated in FIG. 1, data generation system 116 generates genealogical data for a plurality of generations. The source of and the dimensionality of the data is not intended to be limiting. A dataset is associated with one or more data files, databases, etc. Data generation system 116 may provide the dataset to computing device 102 directly through communication interface 110 or may provide the dataset to computing device 102 in the form of a memory media such as a compact disk (CD), digital versatile disk (DVD), etc. As another option, data generation system 116 may store the dataset in database 118.

Different storage architectures can be used to store and organize the dataset. Storage architectures include files in a file system, native XML databases, relational databases, SQL databases, etc. Database 118 may include any type of storage architecture. The database may be organized into multiple databases to improve data management and access. The multiple databases may be organized into tiers. Database 118 may comprise a file system including a plurality of data files. A file system can be implemented with search trees or hash tables or other hierarchical reference mechanisms and stored in a single database or across multiple files or in different storage locations distributed over the Internet or other heterogeneous storage infrastructures. Database 118 may be accessed from computing device 102 using communication interface 110 or may be stored in computer readable medium 108. Remote users may check-out and check-in data and/or files from database 118 as known to those skilled in the art.

As an example, pedigree visualization system 100 may export and import genealogical data communication (GEDCOM) files. GEDCOM uses a data model that links individuals together through families. The individual record contains reference to the families where he/she is a child and where he/she is a spouse. Likewise, a family record contains reference to the individuals who are children or spouses in the family.

Output interface 102 provides an interface for outputting information for review by a user of pedigree visualization system 100. For example, output interface 102 may include an interface to a display 120, a printer 122, a speaker (not shown), etc. Display 120 may be a thin film transistor display, a light emitting diode display, a liquid crystal display, or any of a variety of different displays known to those skilled in the art. Printer 122 may be any of a variety of printers as known to those skilled in the art. The speaker may be any of a variety of speakers as known to those skilled in the art. Computing device 102 may have one or more output interfaces that use the same or a different interface technology. Display 120 and/or printer 122 further may be accessible to computing device 102 through communication interface 110.

Input interface 106 provides an interface for receiving information from the user for entry into computing device 102 as known to those skilled in the art. Input interface 106 may use various input technologies including, but not limited to, a keyboard, a pen and touch screen, a mouse, a track ball, a touch screen, a keypad, one or more buttons, etc. to allow the user to enter information into computing device 102 or to make selections presented in a user interface displayed on display 104. Input interface 106 may provide both an input and an output interface. For example, a touch screen both allows user input and presents output to the user. Computing device 102 may have one or more input interfaces that use the same or a different input interface technology.

Computer-readable medium 108 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Computing device 102 may have one or more computer-readable media that use the same or a different memory media technology. Computing device 102 also may have one or more drives that support the loading of a memory media such as a CD or DVD. Computer-readable medium 108 may comprise a cache in which data can be stored temporarily for rapid access by processor 112. Computer-readable medium 108 further may comprise database 118.

Communication interface 110 provides an interface for receiving and transmitting data between devices using various protocols, transmission technologies, and media as known to those skilled in the art. The communication interface may support communication using various transmission media that may be wired or wireless. Computing device 102 may have one or more communication interfaces that use the same or a different communication interface technology. Data may be transferred between computing device 102 and data generation system 116 using communication interface 110. Additionally, communication interface 110 may provide connectivity to other systems. For example, communication interface 110 may provide connectivity to database 118.

Processor 112 executes instructions as known to those skilled in the art. The instructions may be carried out by a special purpose computer, logic circuits, or hardware circuits. Thus, processor 112 may be implemented in hardware, firmware, software, or any combination of these methods. The term "execution" is the process of running an application or the carrying out of the operation called for by an instruction. The instructions may be written using one or more programming language, scripting language, assembly language, etc. Processor 112 executes an instruction, meaning that it performs the operations called for by that instruction. Processor 112 operably couples with output interface 104, with input interface 106, with computer-readable medium 108, and with communication interface 110 to receive, to send, and to process information. Processor 112 may retrieve a set of instructions from a permanent memory device and copy the instructions in an executable form to a temporary memory device that is generally some form of RAM. Computing device 102 may include a plurality of processors that use the same or a different processing technology.

Pedigree visualization application 114 performs operations associated with processing and presenting visualizations of pedigree data to a user of pedigree visualization system 100. Some or all of the operations described may be embodied in pedigree visualization application 114. The operations may be implemented using hardware, firmware, software, or any combination of these methods. With reference to the example embodiment of FIG. 1, pedigree visualization application 114 is implemented in software stored in computer-readable medium 108 and accessible by processor 112 for execution of the instructions that embody the operations of image pedigree visualization application 114. Pedigree visualization application 114 may be written using one or more programming languages, assembly languages, scripting languages, etc. Pedigree visualization application 114 may be implemented as a plug-in to a data processing and visualization application.

Components of pedigree visualization system 100 may be housed in a single device, positioned in a single location, a single facility, and/or may be remote from one another. Thus, data generation system 116, database 118, and/or computing device 102 may be integrated into a single system. Data generation system 116, database 118, and/or computing device 102 may be connected directly through a wired or wireless technology. For example, data generation system 116 may connect to computing device 102 using a cable for transmitting information between data generation system 116 and computing device 102. Data generation system 116 may connect to computing device 102 using a network. Data may be stored electronically and accessed using computing device 102. Data generation system 116 and computing device 102 does not need to be connected. Instead, the data acquired using data generation system 116 may be manually provided to computing device 102. For example, the data may be stored on electronic media such as a CD, a DVD, a flash drive, etc.

After receiving the data, computing device 102 may initiate processing of the data automatically or under control of an operator of computing device 102.

Figure 2:
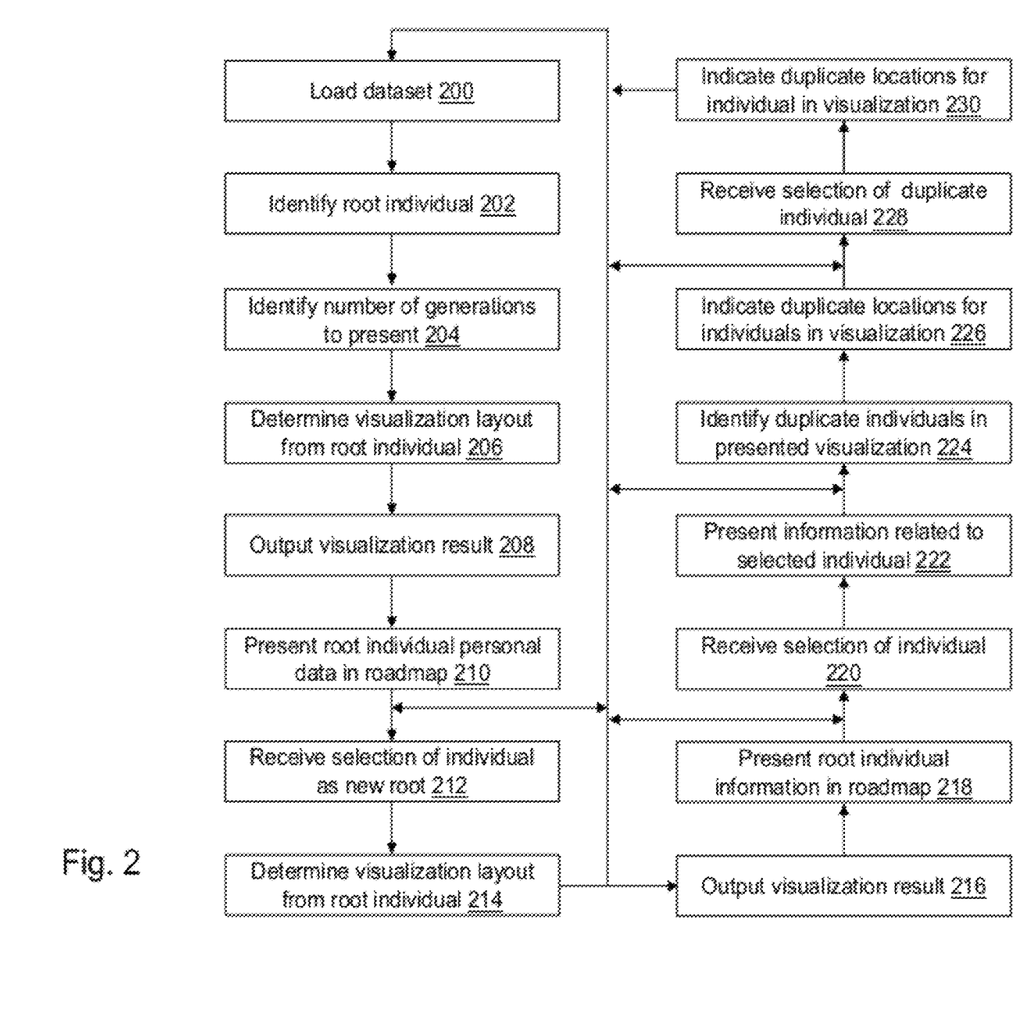
FIG. 2 depicts a flow diagram illustrating example operations performed by the pedigree visualization system of FIG. 1 in accordance with an example embodiment.

With reference to FIG. 2, example operations associated with pedigree visualization application 114 of FIG. 1 are described. Additional, fewer, or different operations may be performed, depending on the embodiment. The order of presentation of the operations of FIG. 2 is not intended to be limiting. In an operation 200, a dataset is loaded for access by pedigree visualization application 114. For example, the dataset may be stored at computing device 102 and selected for input to pedigree visualization application 114 using an interactive dialog box that allows a user to select the data source as well as the loading mechanism associated with the data source. As another alternative, the dataset may be streamed to computing device 102 from data generation system 116 or the dataset may be received by computing device 102 from database 118.

In an example embodiment, the data set is read and the data stored in two arrays. The first array contains the family structure, which has pointers to the parents and children of the family. The second array stores the individual structure, that is, the individual's birth and death information as well as marriage and other genealogical information. The individual's structure also contains pointers to the families to which she/he belongs.

In an operation 202, a root individual is identified from among the plurality of individuals in the dataset. For example, the root individual may be automatically identified as the first individual in the dataset. As another alternative, a user may select the root individual from a list, a display, etc. Pedigree visualization application 114 may receive the selection of the root individual by the user.

In an operation 204, a number of generations to present is identified. For example, pedigree visualization application 114 may include a default number of generations that may be configured by a user and stored in a configuration file. As another alternative, a user may select or enter the number of generations to present from a list, a drop down box, etc. Pedigree visualization application 114 may receive the selection of the number of generations by the user.

In an operation 206, a pedigree visualization for the loaded dataset is determined based on the identified root individual and the identified number of generations. For example, with reference to FIG. 3a, pedigree visualization application 114 may determine a first example layout 300 for five generations from a root individual 301. A father 302 and a mother 304 of root individual 301 are shown above and below root individual 301, respectively. A father 306 and a mother 308 of father 302 are shown to the left and to the right of father 302, respectively. A father 310 and a mother 312 of father 306 are shown above and below father 306, respectively. A father 314 and a mother 316 of father 310 are shown to the left and to the right of father 310, respectively. A father 318 and a mother 320 of mother 312 are shown to the left and to the right of mother 312, respectively.

Figure 3A:
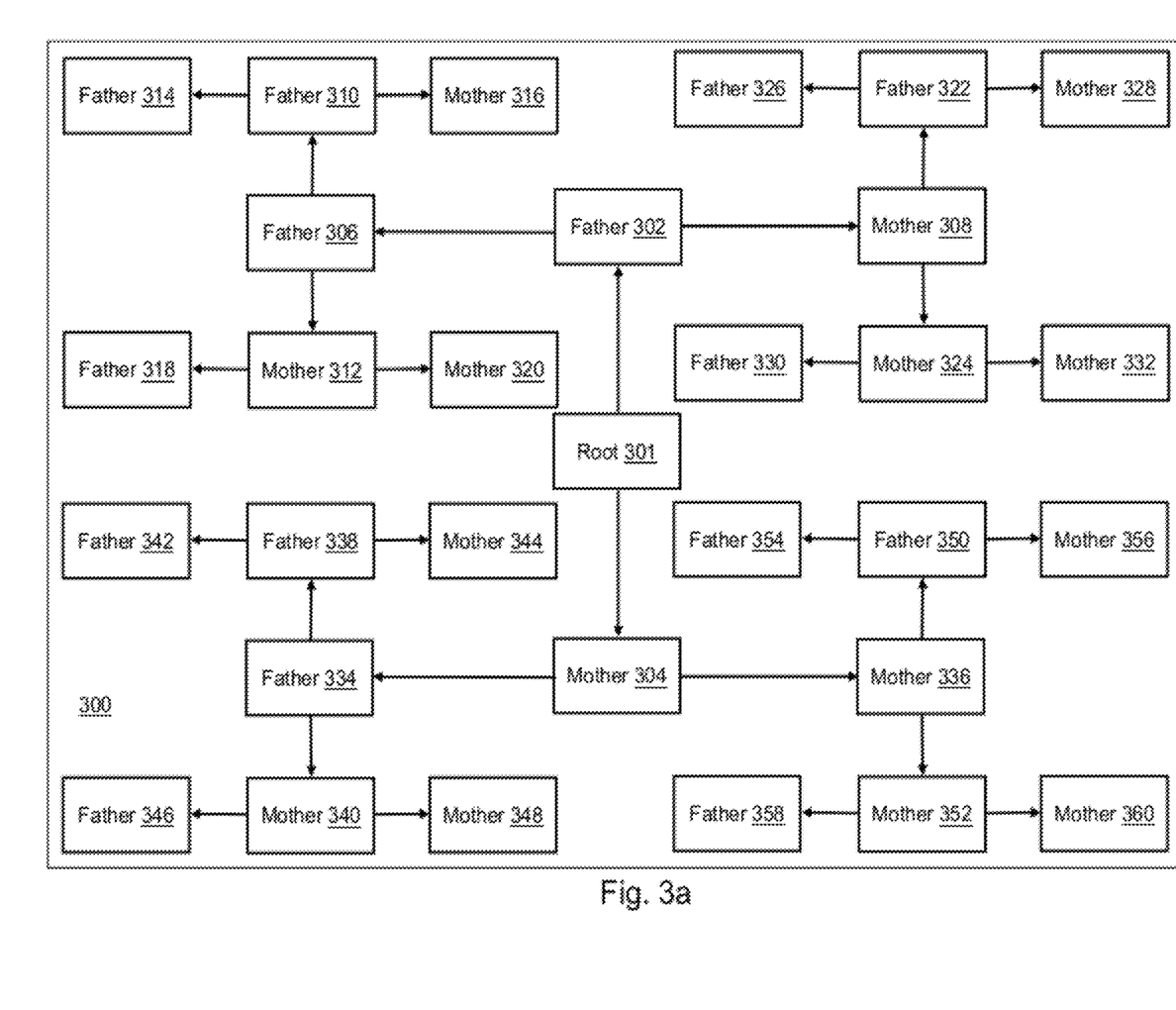
FIG. 3a depicts a first example layout presented in a display of a computing device under control of a processor executing instructions embodied in a pedigree visualization application of the pedigree visualization system of FIG. 1.

A father 322 and a mother 324 of mother 308 are shown above and below mother 308, respectively. A father 326 and a mother 328 of father 322 are shown to the left and to the right of father 322, respectively. A father 330 and a mother 332 of mother 324 are shown to the left and to the right of mother 324, respectively.

A father 334 and a mother 336 of mother 304 are shown to the left and to the right of mother 304, respectively. A father 338 and a mother 340 of father 334 are shown above and below father 334, respectively. A father 342 and a mother 344 of father 338 are shown to the left and to the right of father 338, respectively. A father 346 and a mother 348 of mother 340 are shown to the left and to the right of mother 340, respectively. A father 350 and a mother 352 of mother 336 are shown above and below mother 336, respectively. A father 354 and a mother 356 of father 350 are shown to the left and to the right of father 350, respectively. A father 358 and a mother 360 of mother 352 are shown to the left and to the right of mother 352, respectively.

Thus, each successive generation alternates between a vertical (above/below) and a horizontal (left/right) arrangement relative to the child. As a result, first example layout 300 arranges the paternal family of root individual 301 in an upper half and the maternal family of root individual 301 in a lower half. Additionally, first example layout 300 arranges the paternal grandfather's family of root individual 301 in an upper left quadrant, the paternal grandmother's family of root individual 301 in an upper right quadrant, the maternal grandfather's family of root individual 301 in a lower left quadrant, and the maternal grandmother's family of root individual 301 in a lower right quadrant. As an option, a male family member may be indicated using a color, a shading, etc. that is different from a female family member. To better visualize successive generations, different saturation levels of a color may be used though a different hue of the color may also be used. The distance between the initial generational nodes increases as the number of generations increases to provide sufficient room for the successive generations.

Figure 3B:
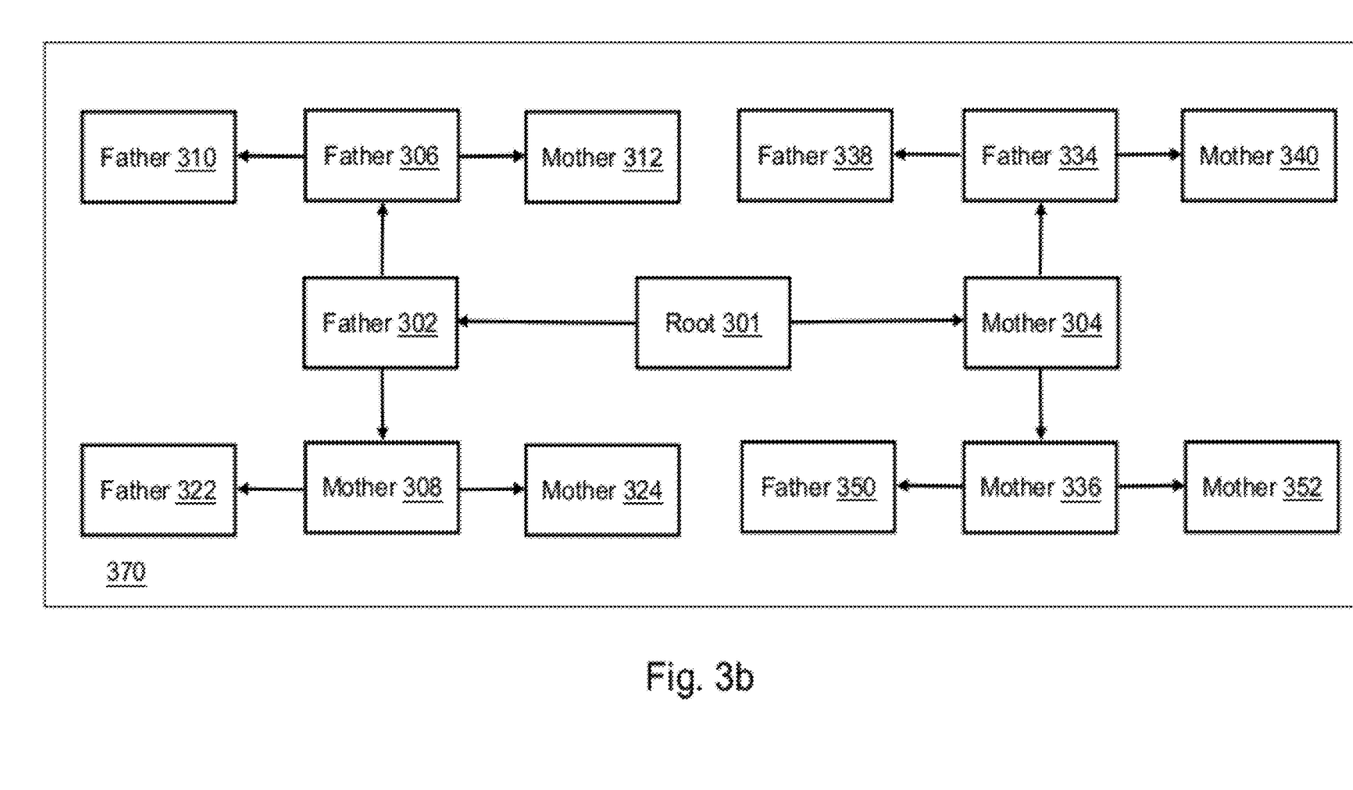
FIG. 3b depicts a second example layout presented in a display of a computing device under control of a processor executing instructions embodied in a pedigree visualization application of the pedigree visualization system of FIG. 1.

As a second example, with reference to FIG. 3b, pedigree visualization application 114 may determine a second example layout 370 for four generations from root individual 301. Father 302 and mother 304 of root individual 301 are shown to the left and to the right of root individual 301, respectively. Father 306 and mother 308 of father 302 are shown above and below father 302, respectively. Father 310 and mother 312 of father 306 are shown to the left and to the right of father 306, respectively. Father 322 and mother 324 of mother 308 are shown to the left and to the right of mother 308, respectively. Father 334 and mother 336 of mother 304 are shown above and below mother 304, respectively. Father 338 and mother 340 of father 334 are shown to the left and to the right of father 334, respectively. Father 350 and a mother 352 of mother 336 are shown to the left and to the right of mother 336, respectively.

Thus, again each successive generation alternates between a horizontal (left/right) and a vertical (above/below) arrangement relative to the child. As a result, second example layout 370 arranges the paternal grandfather's family of root individual 301 in an upper left quadrant, the paternal grandmother's family of root individual 301 in a lower left quadrant, the maternal grandfather's family of root individual 301 in an upper right quadrant, and the maternal grandmother's family of root individual 301 in a lower right quadrant.

In an operation 208, the determined pedigree visualization is presented in display 120 under control of pedigree visualization application 114. In an operation 210, personal data of the identified root individual is presented in display 120 under control of pedigree visualization application 114. For example, pedigree visualization application 114 may cause creation of one or more windows in display 120 as known to those skilled in the art.

Figure 4:
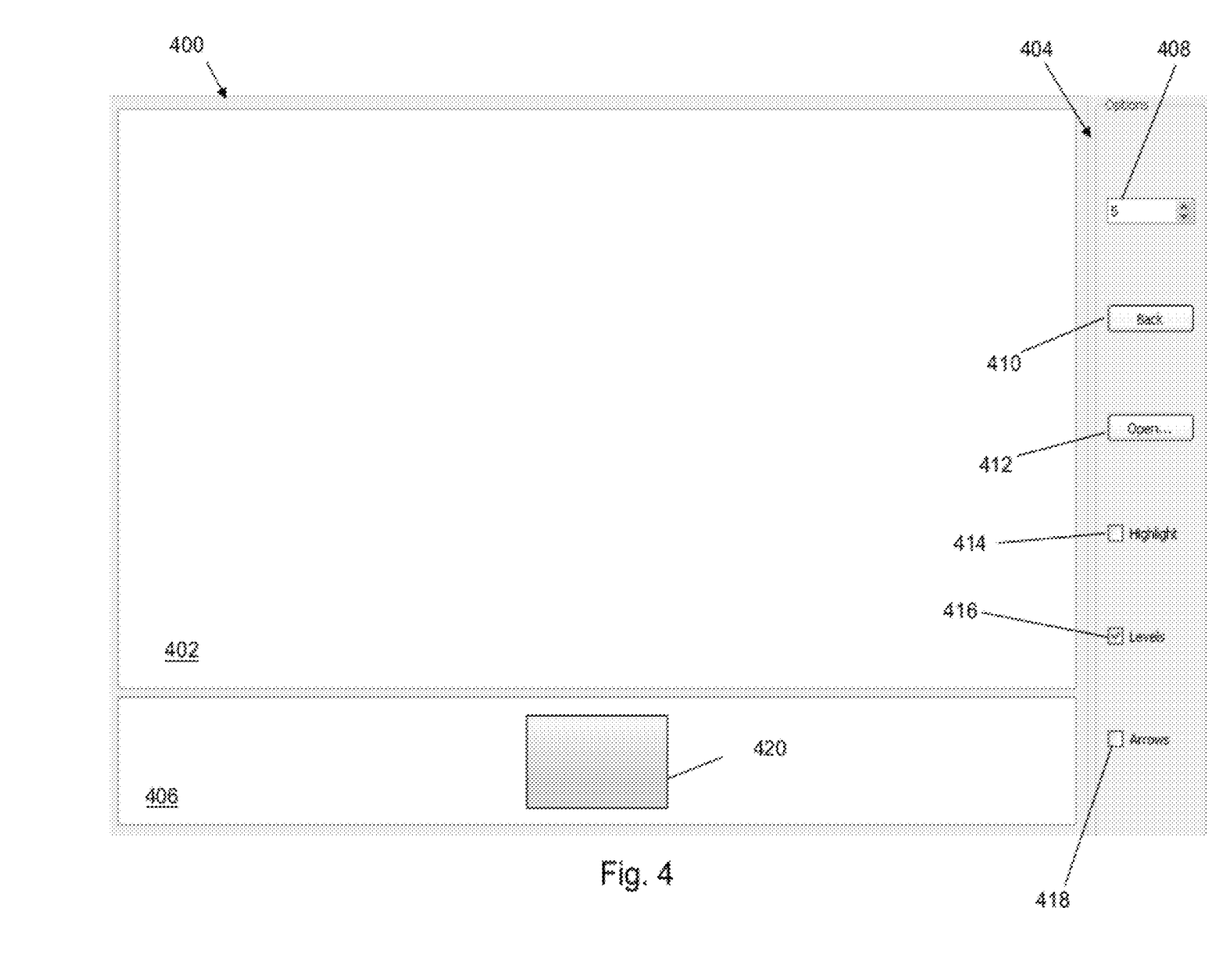
FIG. 4 depicts a user interface presented in a display of a computing device under control of a processor executing instructions embodied in a pedigree visualization application of the pedigree visualization system of FIG. 1 in accordance with an example embodiment.

With reference to FIG. 4, pedigree visualization application 114 causes presentation of a user interface 400 in display 120 in accordance with an example embodiment. User interface 400 may include a pedigree tree visualization window 402, an options panel 404, and a roadmap window 406. A pedigree visualization is presented in pedigree tree visualization window 402. The user can interact with the pedigree visualization using input interface 106. For example, the user can pan in all directions, zoom in and out of pedigree tree visualization window 402, select an individual node or a group of nodes for performance of an action, etc. Panning and zooming can be done manually or automatically. For example, the view may be scaled and translated manually with mouse and keyboard operations while selection zoom allows the user to select a region to view more closely. The selected region may be automatically moved to fill pedigree tree visualization window 402 possibly through an animated transition. A key-press and click may initiate a return to the previous view.

Options panel 404 may include a number of generations selector 408, a back button 410, an open button 412, a highlight button 414, a levels button 416, and an arrows button 418. Selection of number of generations selector 408 allows a user to request a number of generations to present in pedigree tree visualization window 402. The value of number of generations selector 408 may initially be set to a default value that may be modified by a user using a configurations setting. Selection of back button 410 allows a user to return to a previously presented pedigree visualization presented in pedigree tree visualization window 402. Selection of open button 412 causes presentation of a dialog box that allows a user to select a dataset to load. Selection of highlight button 414 allows a user to select a node from the pedigree visualization presented in pedigree tree visualization window 402. Selection of levels button 416 changes the coloration method used to identify the different generation levels in pedigree tree visualization window 402. Selection of arrows button 418 positions arrows directed toward a parent node at one end of each line in the pedigree visualization presented in pedigree tree visualization window 402. Roadmap window 406 includes one or more individual identifiers starting with a node identifier box 420 identifying the root individual. In an example embodiment, roadmap window 406 is scrollable.

Figure 5A:
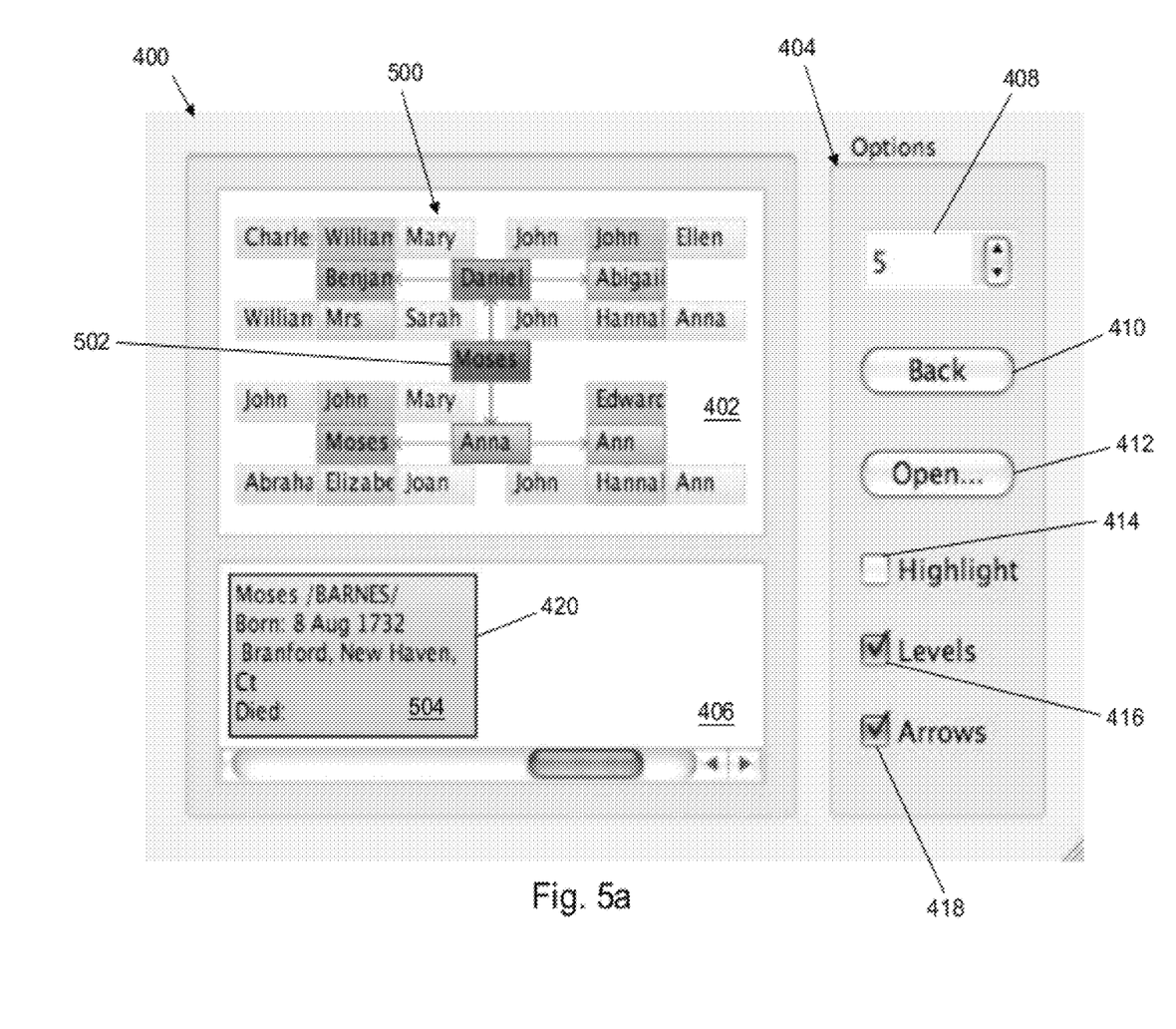
FIGS. 5a and 5b depict the user interface of FIG. 4 after presentation of pedigree visualization in accordance with an example embodiment.

With reference to FIG. 5a, a first pedigree visualization 500 is presented in pedigree tree visualization window 402 of user interface 400 in accordance with an example embodiment. First pedigree visualization 500 includes a root individual 502 and the five generations preceding root individual 502 where information is included in the dataset. Personal data 504 associated with root individual 502 is shown in node identifier box 420. For example, personal data 504 may include a full name, a birth date and location, and a death date and location. Personal data 504 may include additional information including photographs, links to photographs, information associated with children, marriages, etc.

In the example embodiment of FIG. 5a, none of the family groups of the individuals within a generation of first pedigree visualization 500 overlap, and the nodes of first pedigree visualization 500 automatically fill the entire space in pedigree tree visualization window 402 of user interface 400 and are formed of rectangles of equal size. The size and information contained in the rectangles may automatically adjust to the size of pedigree tree visualization window 402 of user interface 400 and the number of generations identified for presentation. Thus, as the number of generations selected increases, the size of the rectangles decreases to present the selected number of generations. The content of the rectangles may also automatically decrease as the size of the rectangles decreases.

In an operation 212, a selection of a new individual as the root individual is received. For example, the new individual can be selected as the root individual by pressing the shift key and selecting the desired individual. In an operation 214, a second pedigree visualization for the loaded dataset is determined based on the new individual identified as the root individual and the identified number of generations. The new individual identified as the root individual is moved to the center of pedigree tree visualization window 402. In an operation 216, the determined pedigree visualization is presented in display 120 under control of pedigree visualization application 114. In an operation 218, personal data of the new individual identified as the root individual is presented in display 120 under control of pedigree visualization application 114. To keep the context of how the new root individual is connected to the original root, roadmap window 406 is updated to show all the individuals (lineage) on the path between the original and the new root individual. When the user selects back button 410, roadmap window 406 is updated to change the root individual to the previous root individual. The root individual can be changed any number of times, and a history may be kept to enable the user to backtrack using back button 410.

Figure 5B:
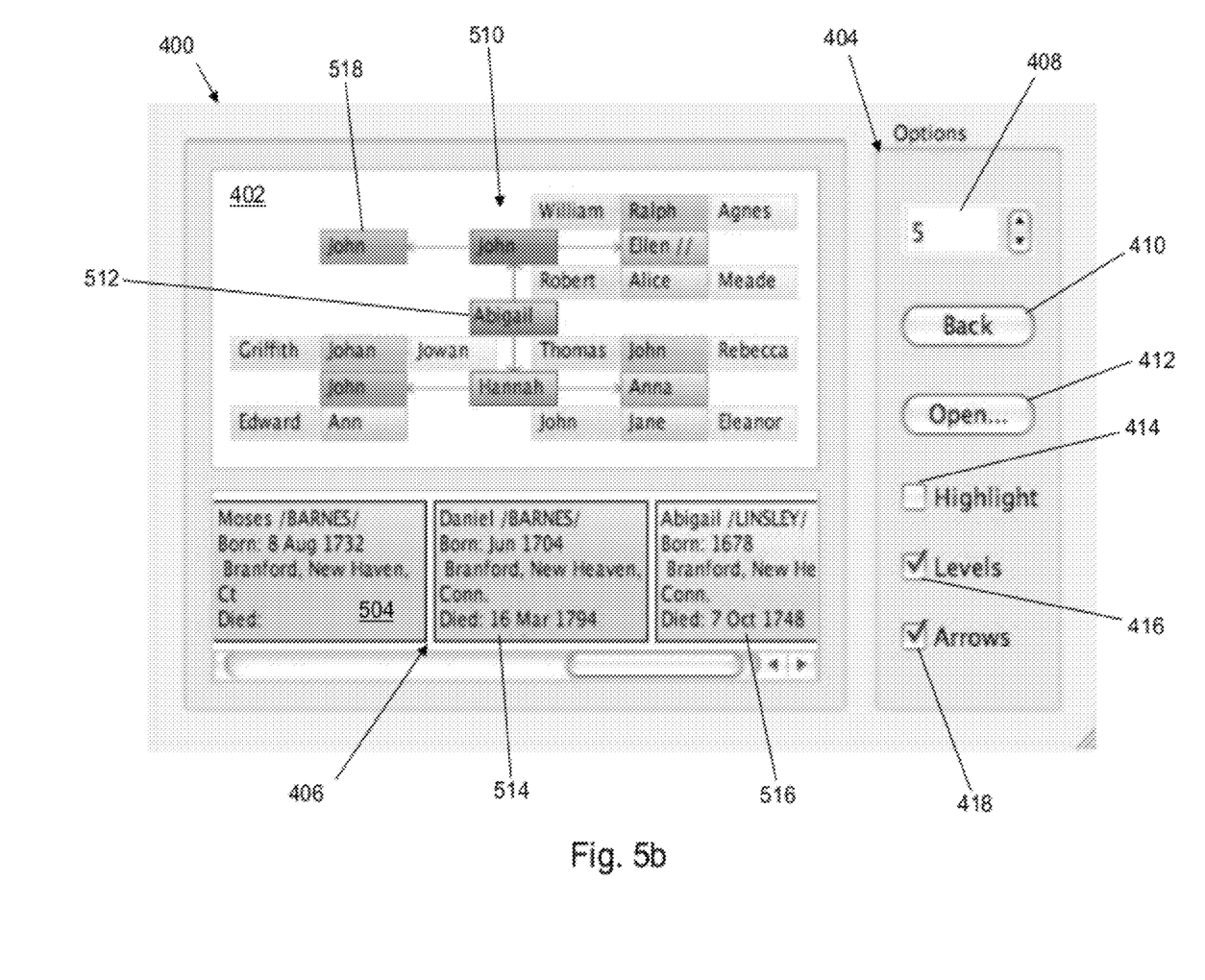

As an example, with reference to FIG. 5b, a second pedigree visualization 510 is presented in pedigree tree visualization window 402 of user interface 400 in accordance with an example embodiment. Second pedigree visualization 510 includes a second root individual 512 and the five generations preceding second root individual 512 where information is included in the dataset. Roadmap window 406 is updated to include personal data 504 associated with root individual 502, second personal data 514 associated with the father of root individual 502, and third personal data 516 associated with the mother of the father of root individual 502 selected as second root individual 512. Thus, roadmap window 406 presents the relationship between successive root individuals as the selection is changed. Where information related to subsequent generations is missing, no information is shown, but the spacing is maintained to provide a visual indication of the missing information. For example, no parental information for a paternal grandfather node 518 of second pedigree visualization 510 is included in the dataset so the area around paternal grandfather node 518 is empty to indicate the missing information.

Figure 6:
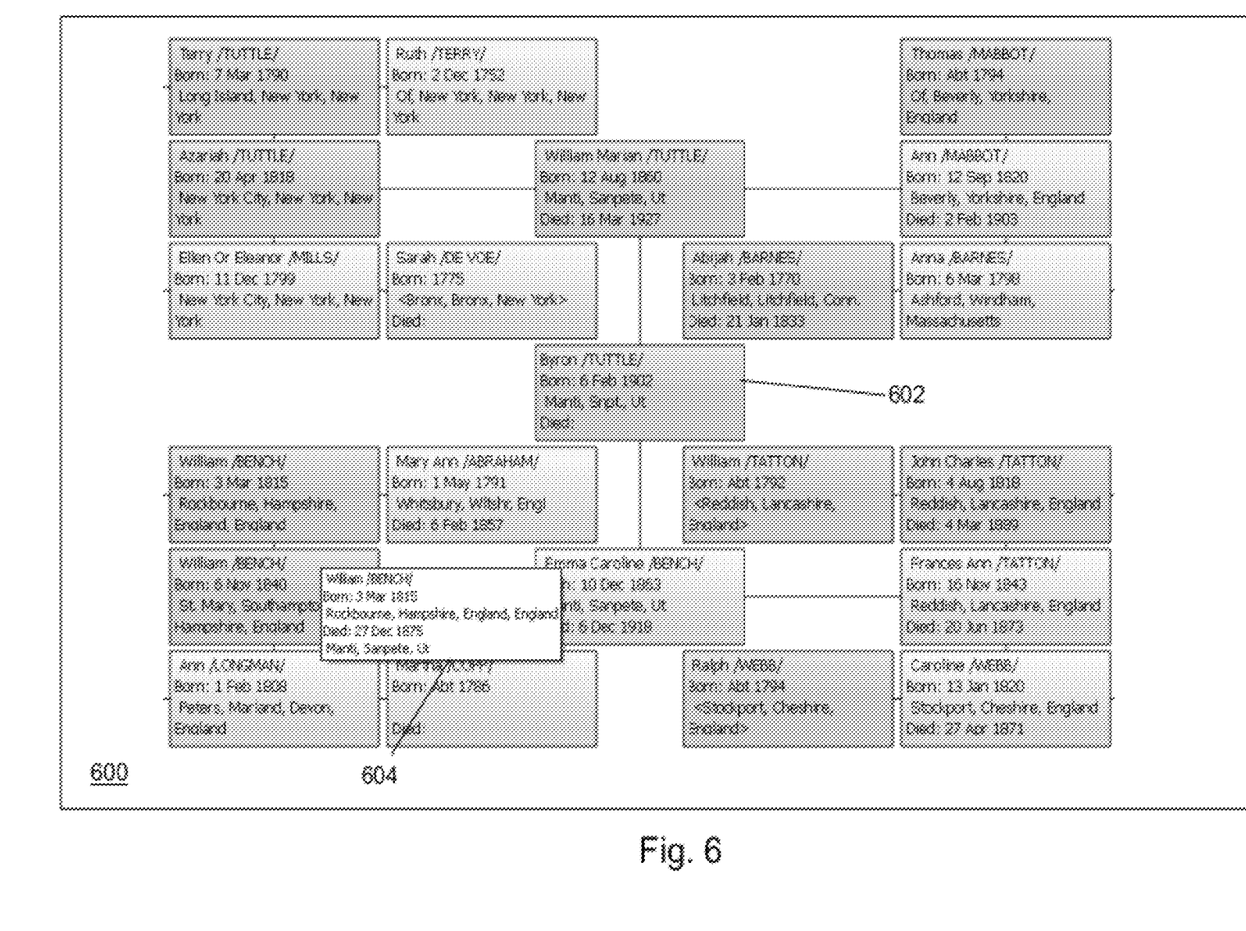
FIG. 6 depicts a partial view of a sample pedigree tree illustrating an information window in accordance with an example embodiment.

In an operation 220, a selection of an individual in a pedigree visualization is received. In an operation 222, personal data associated with the selected individual is presented in display 120 under control of pedigree visualization application 114. For example, with reference to FIG. 6, a third pedigree visualization 600 is presented in accordance with an example embodiment. Third pedigree visualization 600 includes a third root individual 602 and a personal data information box 604. Personal data information box 604 may be presented as a user scrolls across or hovers over a node in third pedigree visualization 600. Personal data information box 604 includes additional personal information associated with a selected node.

Figure 7:
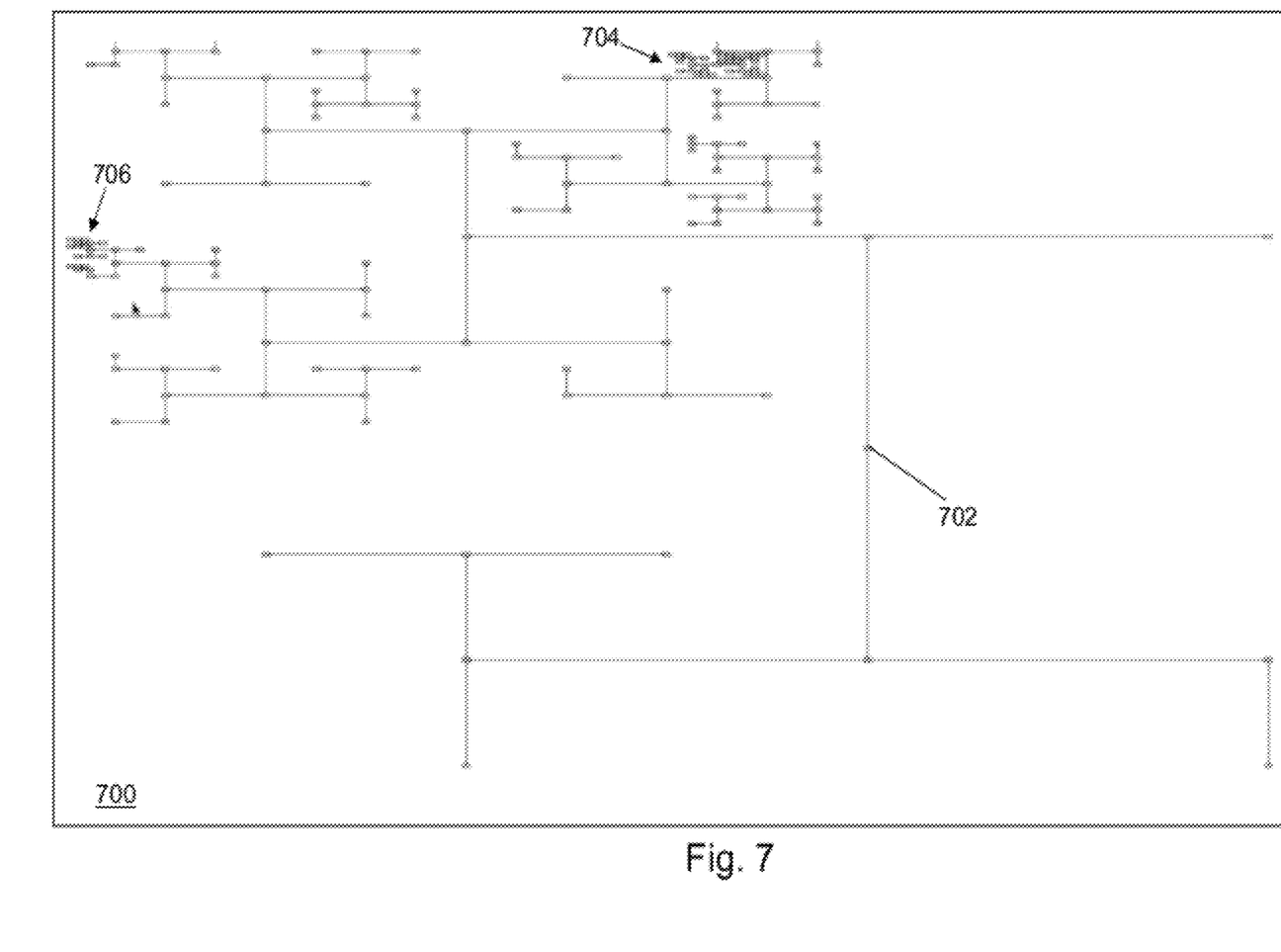
FIG. 7 depicts a partial view of a second sample pedigree tree showing 15 generations in accordance with an example embodiment.

With reference to FIG. 7, a fourth pedigree visualization 700 is presented in accordance with an example embodiment. Fourth pedigree visualization 700 includes 15 generations from a root node 702. Areas of missing and available data are readily apparent. For example, a first area 704 and a second area 706 of extensive generational data for the paternal grandfather of root node 702 are readily visible in fourth pedigree visualization 700. For additional information, a user can zoom into either area or move, for example, a mouse over an individual for presentation of personal data information box 604.

Figure 8:
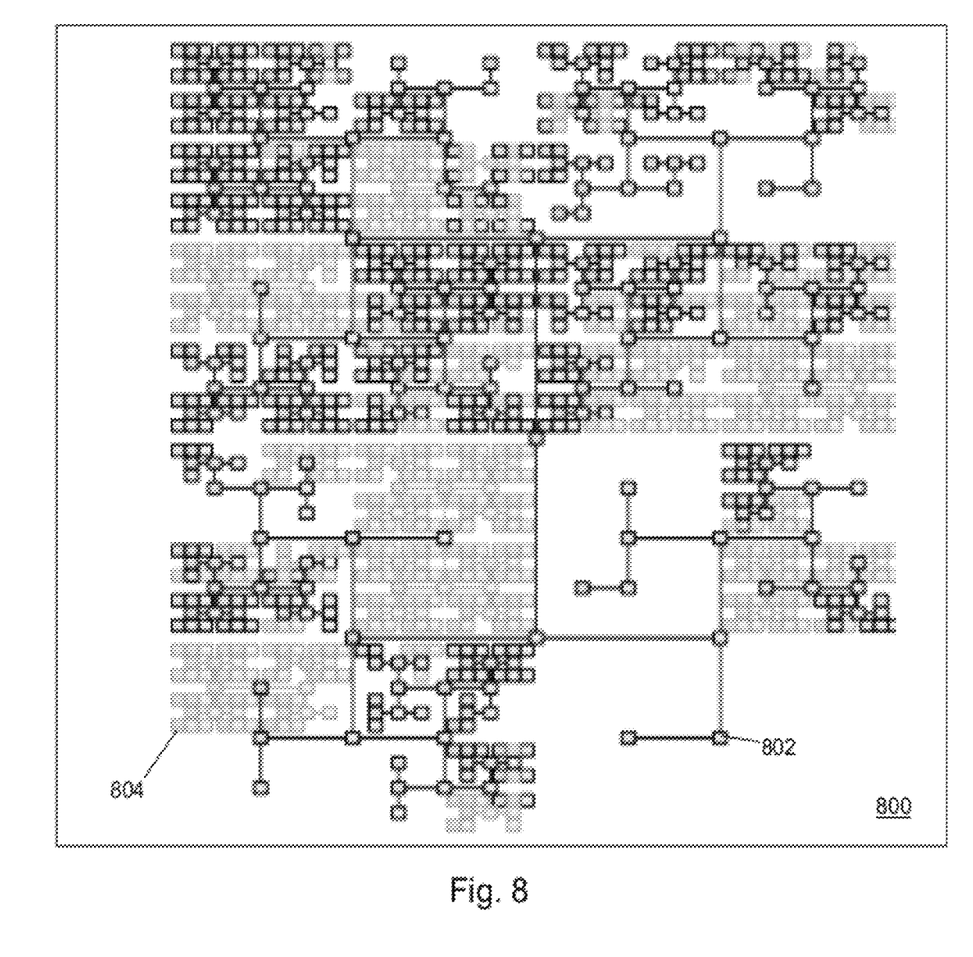
FIG. 8 depicts a partial view of a third sample pedigree tree showing unique individuals and duplicate individuals in accordance with an example embodiment.

In an operation 224, duplicate individuals are identified in a dataset or a subset of a dataset based on the number of generations identified. In an operation 226, locations of the identified duplicate individuals are indicated in a pedigree visualization presented in display 120 under control of pedigree visualization application 114. As an example, duplicate individuals may be distinguished by outlining them in bright blue rather than black, or by outlining them in gray rather than black, depending on whether or not the highlight mode is turned on by selection of highlight button 414. More specifically, the first occurrence of an individual may be outlined in black, but the rest are outlined in bright blue (or gray), allowing the user to easily see the number of unique individuals as well as the number of duplicates. For example, with reference to FIG. 8, a fifth pedigree visualization 800 is presented in accordance with an example embodiment. Duplicate individuals are indicated in fifth pedigree visualization 800 with a gray border line and unique individuals are indicated in fifth pedigree visualization 800 with a black border line though other indicators may be used. For example, fifth pedigree visualization 800 includes a unique node 802 shown with a black border line and a duplicate node 804 shown with a gray border line.

Figure 9:
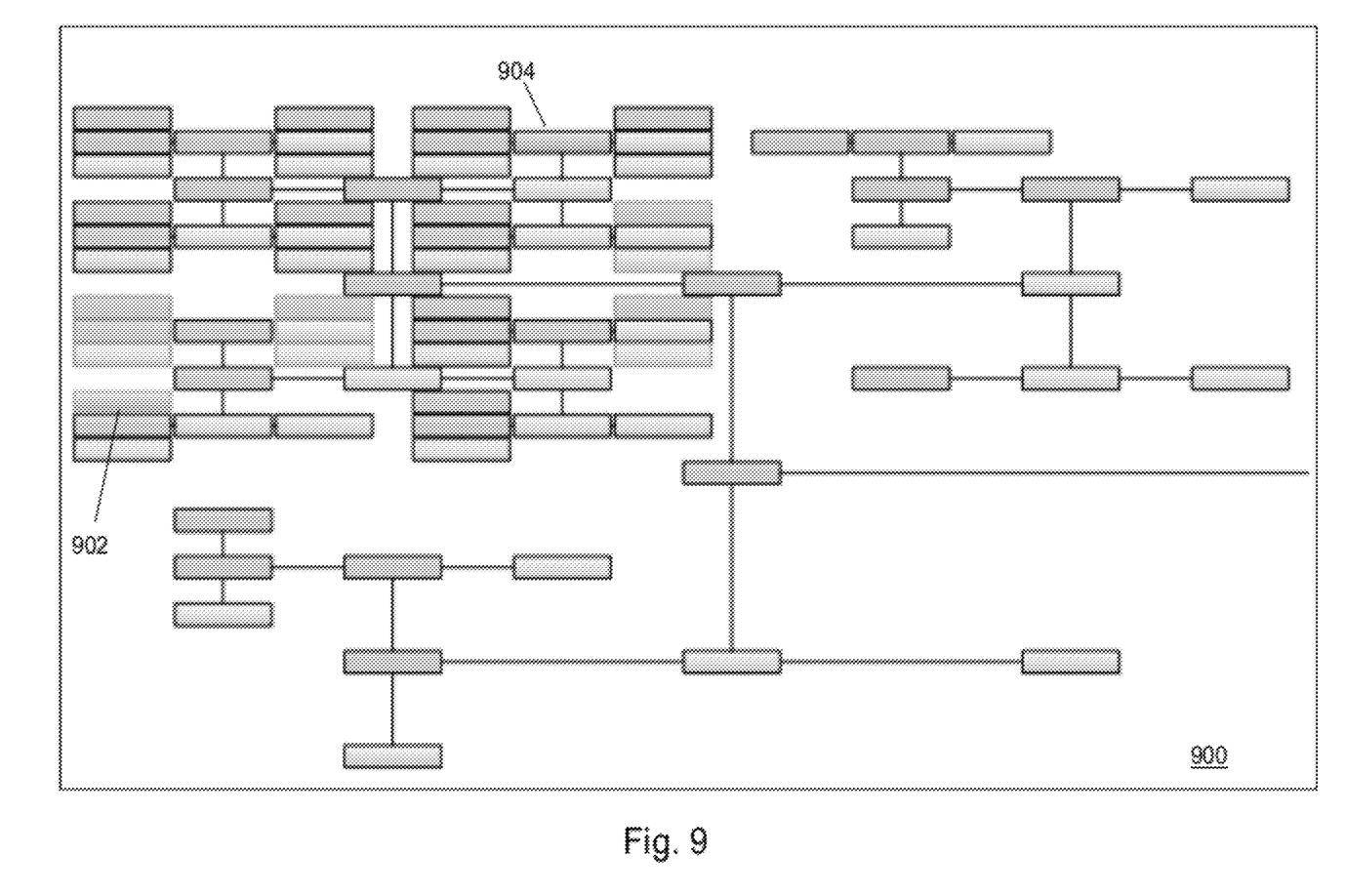
FIG. 9 depicts a partial view of a fourth sample pedigree tree highlighting a duplicate individual in accordance with an example embodiment.

In an operation 228, selection of a duplicate individual is received. In an operation 230, locations of the selected duplicate individual are indicated in a pedigree visualization presented in display 120 under control of pedigree visualization application 114. As an example, when the highlight mode is turned on by selection of highlight button 414, the outlines of the duplicates may change to gray, and the user is able to select a duplicate individual, causing all instances of that individual to appear in bright blue. For example, with reference to FIG. 9, a sixth pedigree visualization 900 is presented in accordance with an example embodiment. A duplicate individual 902 is selected by a user and other locations of the individual in the pedigree tree are shown with highlighting though other indicators may be used. For example, the individual is also included in sixth pedigree visualization 900 at a node 904.

As indicated in FIG. 2, the user may interact with pedigree visualization application 114 by executing a series of operations in any succession.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more". The example embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
an output device;
a processor operably coupled to the output device; and
a computer-readable medium operably coupled to the processor, the computer-readable medium having instructions stored thereon that, when executed by the processor, cause the system to
identify a root individual in a genealogical dataset;
identify a first parent and a second parent of the identified root individual from the genealogical dataset;
identify a third parent and a fourth parent from the genealogical dataset, wherein the third parent and the fourth parent are parents of the identified first parent;
control presentation of a pedigree visualization relative to the identified root individual by the output device,
wherein the pedigree visualization includes a root indicator for the identified root individual, a first parent indicator for the identified first parent, a second parent indicator for the identified second parent, a third parent indicator for the identified third parent, and a fourth parent indicator for the identified fourth parent, and
further wherein the first parent indicator is positioned along a first axis through the root indicator, the second parent indicator is positioned along the first axis through the root indicator in the opposite direction as the first parent indicator relative to the root indicator, the third parent indicator is positioned along a second axis through the first parent indicator, wherein the first axis is perpendicular to the second axis, and the fourth parent indicator is positioned along the second axis through the first parent indicator in the opposite direction as the third parent indicator relative to the first parent indicator.

2. A computer-readable medium having stored thereon computer-readable instructions that, when executed by a computing device, cause the computing device to:
identify a root individual in a genealogical dataset;
identify a first parent and a second parent of the identified root individual from the genealogical dataset;
identify a third parent and a fourth parent from the genealogical dataset, wherein the third parent and the fourth parent are parents of the identified first parent;
control presentation of a pedigree visualization relative to the identified root individual by an output device,
wherein the pedigree visualization includes a root indicator for the identified root individual, a first parent indicator for the identified first parent, a second parent indicator for the identified second parent, a third parent indicator for the identified third parent, and a fourth parent indicator for the identified fourth parent, and
further wherein the first parent indicator is positioned along a first axis through the root indicator, the second parent indicator is positioned along the first axis through the root indicator in the opposite direction as the first parent indicator relative to the root indicator, the third parent indicator is positioned along a second axis through the first parent indicator, wherein the first axis is perpendicular to the second axis, and the fourth parent indicator is positioned along the second axis through the first parent indicator in the opposite direction as the third parent indicator relative to the first parent indicator.

3. A method of visually representing pedigree data in an output device, the method comprising:
identifying, by a computing device, a root individual in a genealogical dataset;

identifying, by the computing device, a first parent and a second parent of the identified root individual from the genealogical dataset;

identifying, by the computing device, a third parent and a fourth parent from the genealogical dataset, wherein the third parent and the fourth parent are parents of the identified first parent;

controlling presentation of a pedigree visualization relative to the identified root individual by an output device, wherein the pedigree visualization includes a root indicator for the identified root individual, a first parent indicator for the identified first parent, a second parent indicator for the identified second parent, a third parent indicator for the identified third parent, and a fourth parent indicator for the identified fourth parent, and further wherein the first parent indicator is positioned along a first axis through the root indicator, the second parent indicator is positioned along the first axis through the root indicator in the opposite direction as the first parent indicator relative to the root indicator, the third parent indicator is positioned along a second axis through the first parent indicator, wherein the first axis is perpendicular to the second axis, and the fourth parent indicator is positioned along the second axis through the first parent indicator in the opposite direction as the third parent indicator relative to the first parent indicator.

4. The computer-readable medium of claim 2, wherein the computer-readable instructions further cause the computing device to identify a number of generations from the genealogical dataset for presentation by the output device.

5. The computer-readable medium of claim 4, wherein the computer-readable instructions further cause the computing device to control presentation of the identified number of generations from the genealogical dataset by the output device by alternating successive parental generation indicators about a third axis that is parallel to the first axis and a fourth axis that is parallel to the second axis relative to a child indicator.

6. The computer-readable medium of claim 5, wherein the computer-readable instructions further cause the computing device to automatically adjust a size of the alternating successive parental generation indicators based on the identified number of generations.

7. The computer-readable medium of claim 5, wherein the computer-readable instructions further cause the computing device to automatically adjust a content of the alternating successive parental generation indicators based on the identified number of generations.

8. The computer-readable medium of claim 5, wherein the computer-readable instructions further cause the computing device to automatically space the alternating successive parental generation indicators to indicate missing parental data.

9. The computer-readable medium of claim 2, wherein the first parent indicator and the second parent indicator distinguish between a male and a female.

10. The computer-readable medium of claim 2, wherein the first parent indicator and the third parent indicator distinguish between a first generation and a second generation.

11. The computer-readable medium of claim 2, wherein the root indicator includes information related to the identified root individual.

12. The computer-readable medium of claim 11, wherein the information is selected from the group consisting of a name, a birth date, a birth location, a death date, a death location, a marriage indication, and a photograph.

13. The computer-readable medium of claim 2, wherein the computer-readable instructions further cause the computing device to control presentation of information related to the identified root individual in a roadmap window of the output device.

14. The computer-readable medium of claim 2, wherein the computer-readable instructions further cause the computing device to receive a selection of a second root individual and control an update of the pedigree visualization to indicate the selected second root individual in a center of the pedigree visualization.

15. The computer-readable medium of claim 14, wherein the computer-readable instructions further cause the computing device to control presentation of information related to the identified root individual in a roadmap window of the output device.

16. The computer-readable medium of claim 15, wherein the computer-readable instructions further cause the computing device to control an update of the roadmap window to include second information related to the identified second root individual.

17. The computer-readable medium of claim 16, wherein the roadmap window is further updated to include third information related to a lineage between the identified root individual and the identified second root individual.

18. The computer-readable medium of claim 2, wherein the computer-readable instructions further cause the computing device to receive a selection of an indicator presented in the pedigree visualization and controlling presentation of information related to an individual associated with the selected indicator.

19. The computer-readable medium of claim 2, wherein the computer-readable instructions further cause the computing device to control presentation of a duplicate indicator indicating a duplicate individual in the pedigree visualization.

20. The computer-readable medium of claim 19, wherein the computer-readable instructions further cause the computing device to receive a selection of the duplicate indicator presented in the pedigree visualization and controlling presentation of a plurality of duplicate individual indicators associated with the selected duplicate indicator.

* * * * *